United States Patent [19]

Umehara et al.

[11] Patent Number: 5,168,185
[45] Date of Patent: Dec. 1, 1992

[54] SWING-TYPE ACTUATOR

[75] Inventors: Teruo Umehara, Hanyu; Saburo Okada, Fukaya, both of Japan

[73] Assignee: Hitachi Metals, Ltd., Tokyo, Japan

[21] Appl. No.: 773,406

[22] Filed: Oct. 9, 1991

[30] Foreign Application Priority Data

| | | | |
|---|---|---|---|
| Oct. 9, 1990 | [JP] | Japan | 2-106154[U] |
| Oct. 16, 1990 | [JP] | Japan | 2-108244[U] |
| Dec. 20, 1990 | [JP] | Japan | 2-403961[U] |
| Jan. 10, 1991 | [JP] | Japan | 3-3512[U] |

[51] Int. Cl.⁵ .................. H02K 33/00; G11B 5/55
[52] U.S. Cl. .......................... 310/15; 310/13; 360/106
[58] Field of Search ............... 310/12, 13, 15; 360/104, 105, 106, 122, 125

[56] References Cited

U.S. PATENT DOCUMENTS

| | | | |
|---|---|---|---|
| 4,150,407 | 4/1979 | Dijkstra | 360/106 |
| 4,196,456 | 4/1980 | Manzke et al. | 360/106 |
| 4,544,973 | 10/1985 | Van De Bult | 360/106 |
| 4,553,058 | 11/1985 | Iwasaki | 310/268 |
| 4,639,624 | 1/1987 | Ejiri et al. | 310/154 |
| 4,849,840 | 7/1989 | Fujioka | 360/104 |
| 4,855,853 | 8/1989 | Matsushita et al. | 360/106 |
| 4,879,617 | 11/1989 | Sampietro et al. | 360/106 |
| 4,949,194 | 8/1990 | MacPherson et al. | 360/104 |
| 4,951,023 | 8/1990 | Erd et al. | 335/222 |
| 4,985,652 | 1/1991 | Oudet et al. | 310/15 |
| 5,034,837 | 7/1991 | Schmitz | 360/105 |

FOREIGN PATENT DOCUMENTS

| | | | |
|---|---|---|---|
| 55-67975 | 5/1980 | Japan | 360/106 |
| 56-19561 | 2/1981 | Japan | 360/106 |
| 58-57721 | 4/1983 | Japan | 360/106 |
| 59-124066 | 7/1984 | Japan | 360/106 |
| 60-159566 | 10/1985 | Japan | 360/106 |
| 63-142574 | 6/1988 | Japan | 360/106 |
| 64-89946 | 4/1989 | Japan | 360/106 |
| 2-310865 | 12/1990 | Japan | 360/70 |

*Primary Examiner*—Steven L. Stephan
*Assistant Examiner*—Matthew Nguyen
*Attorney, Agent, or Firm*—Finnegan, Henderson, Farabow, Garrett & Dunner

[57] ABSTRACT

A swing-type actuator having (a) a housing including a pair of yokes opposing each other and a permanent magnet attached to at least one of the yokes for defining a magnetic gap therebetween; (b) a swingable arm having one end to which a movable coil is fixed and the other end to which a function member is fixable, such that the movable coil is swingable in the magnetic gap; (c) a hold member formed from injection molded thermoplastic resin, which encompasss a periphery of the movable coil and is integrally fixed to the arm; and (d) a resin coating layer formed on surfaces of the movable coil and the hold member to minimize detachment of mold "flashes". Also, surfaces on the arm and adjacent ledge surfaces on the hold member are provided to promote alignment of the parts in the mold and thereby minimizes flash formation. The hold member also can include an integral rib inside the hollow coil and a stopper member to prevent inadvertent contact between lead wires and non-associated terminal pins during molding.

7 Claims, 5 Drawing Sheets

SWING-TYPE ACTUATOR

BACKGROUND OF THE INVENTION

The present invention relates to a swing-type actuator such as an actuator for magnetic disk drives, and more particularly to a swing-type actuator capable of swinging a function member such as a magnetic head along a circular course.

Figure 11:
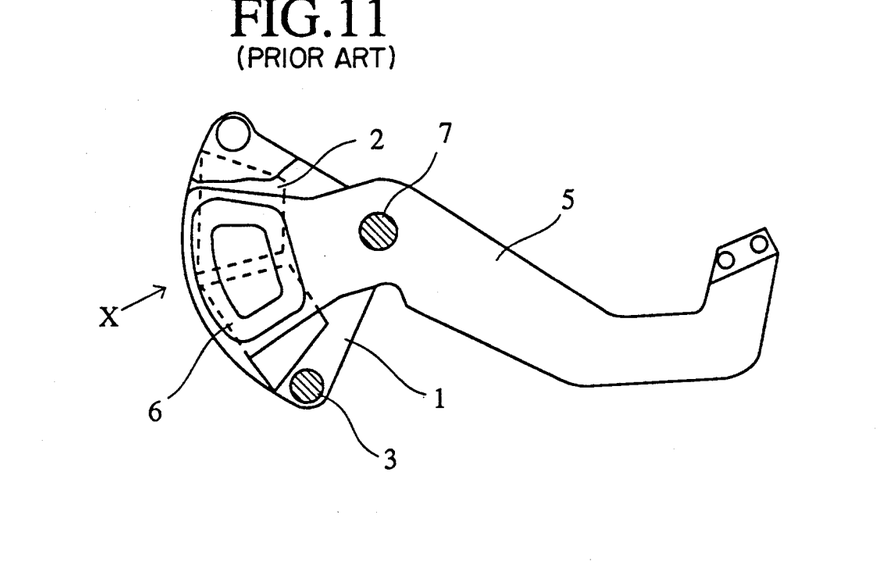
FIG. 11 is a partially cross-sectional plan view showing one conventional swing-type actuator.
Figure 12:
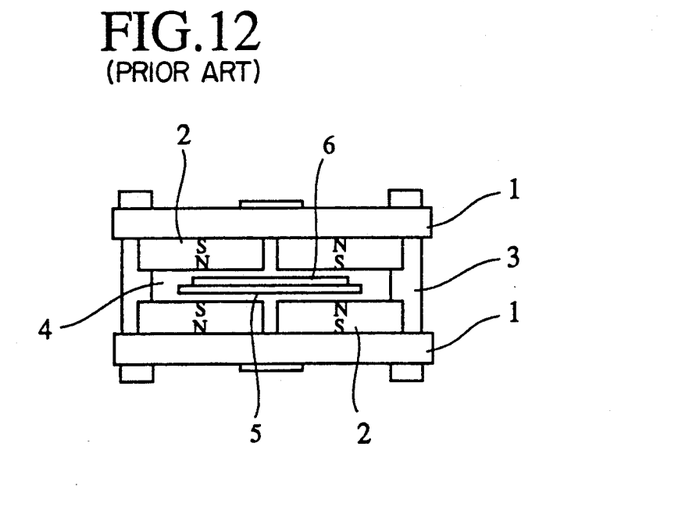
FIG. 12 is a side view of the swing-type actuator of FIG. 11 when viewed from X.

Conventionally, the positioning of a magnetic head on a recording track of a magnetic disk, etc. is conducted by a swing-type or rotation-type actuator as shown in FIGS. 11 and 12. In both figures, a yoke 1 is fixedly provided with permanent magnets 2, and a pair of yokes 1 are assembled by supports 3 such that different magnetic poles of the permanent magnets 2 are opposite each other via a magnetic gap 4 to form a magnetic circuit. 5 represents an arm having one end to which a flat movable coil 6 is fixed, and the other end to which a magnetic head (not shown) is fixed. The arm 5 is arranged such that the movable coil 6 located in the magnetic gap 4 can swing around a shaft 7.

When an operation signal is supplied to the movable coil 6, a magnetic force generated from the movable coil 6 according to Fleming's left hand rule functions as an attraction force or a repulsion force to each permanent magnet 2, so that the arm 5 is rotated around the shaft 7. As a result, a magnetic head fixed to a tip end of the arm 5 is positioned on a desired magnetic track of a magnetic disk (not shown). The direction of the rotation of the arm 5 can be changed by inverting the direction of current applied to the movable coil 6. To regulate the swing span of the movable coil 6, there may be stoppers (not shown) with which inner surfaces of the movable coil 6 are brought into contact.

In the above conventional actuator for magnetic disk drives, the movable coil 6 is usually fixed to the arm 5 by an adhesive. However, the fixing of the movable coil 6 by an adhesive is sometimes troublesome, failing to provide accurate positioning of the movable coil 6. In addition, handling of terminals of the movable coil 6 is complicated, lowering the efficiency of assembling of the arm 5. Since there is increasingly higher demand for miniaturization and reduction in thickness of magnetic disk drives, it is necessary to improve the positioning accuracy of the movable coil 6, and the efficiency and reliability of fixing of the movable coil 6 to the actuator 5. In this sense, the conventional arms fail to satisfy these requirements.

To solve the above problems, attempts have been made to integrally fix a movable coil 6 to an arm 5 by an integral resin molding (for instance, U.S. Pat. No. 4,855,853 and Japanese Utility Model Laid-Open No. 60-159566). In such a structure, the movable coil can be supported by a simplified structure, and the thickness of the movable coil can be extremely reduced. Accordingly, such a structure is advantageous for miniaturizing actuators. Also, miniaturization can be achieved by fixing one or more permanent magnets 2 to only one of the yokes 1, 1 to constitute the magnetic circuit.

However, in the above resin-molded structure, there are several problems.

First, the resin molding structure is generally produced by an injection molding method, but the resulting resin molding is likely to have a flash. Specifically, in the injection molding, the arm 5 and the movable coil 6 having lead wires to which terminal pins (not shown) are soldered are placed in a cavity of an injection mold, and a molten thermoplastic resin is injected into the cavity. After solidification, the resulting molding is taken out of the mold. By injection molding, the arm 5 and the movable coil 6 are integrally molded.

The injection mold is constituted by a pair of mold halves which are divided along a parting line. A parting face of each mold half is worked at a high precision, and there is desirably no gap between the mold halves along the parting line when they are closed. However, by use for a long period of time, the mold faces are worn, resulting in a slight gap along the parting line depending upon a mold compression force and an injection pressure. Due to such a gap, the resin injected into a cavity of the mold enters into the gap, resulting in the formation of a flash.

Also, when the arm has a cylindrical outer surface, there is inevitably a clearance between the arm and an inner surface of the cavity, because of a dimensional error of the arm, etc. Accordingly, there is also a gap. When the resin enters into the gap, a foil-shaped or film-shaped flash is formed in a boundary between the arm and the resin molding part.

The existence of the flash deteriorates the appearance of the actuator, and if the flash falls onto a recording medium such as a magnetic disk during the operation, it interferes with the reading and writing function of the reading medium, lowering the reliability of a recording apparatus.

It is generally extremely difficult to make the mold halves free from a gap along a parting line, and if there is no gap, the mold halves would be rather rapidly worn, and an injection molding operation would become less efficient. Accordingly, at present the flash is removed from the resin molding part of the finished arm manually. This manual removal of the flash is a labor-intensive, lengthy operation.

Second, it is possible to achieve the reduction of weight by using a structure in which a periphery of the movable coil 6 is held by molding. However, when the movable coil 6 is thin as in a 2.5-inch-FDD, a good balance with the arm 5 cannot be maintained. Particularly, in the case of a swing-type actuator having many kinds of function members attached to the arm 5, the operation of the arm 5 cannot be conducted smoothly. Also, in a case where the movable coil 6 is thin, the movable coil 6 does not have a sufficient rigidity.

Third, in the above injection molding, terminal pins to which lead wires of the movable coil are connected are usually provided on or near a line connecting a center of the arm and a center of the movable coil, and to achieve easy connection with an external power supply, it is advantageous that the terminal pins are provided near the side edge of the movable coil. However, in such a structure, a pair of lead wires to be connected with the terminal pins are inevitably disposed close to each other.

Accordingly, this structure is disadvantageous in that good insulation is not always ensured between the lead wires and the movable coil, because it is likely that the lead wires are brought into contact with each other or with wrong terminal pins due to the resin flow during the injection molding. Also, depending upon the direction of the resin flow, the lead wires may be exposed from a surface of the resin molding or may be cut in an extreme case.

OBJECT AND SUMMARY OF THE INVENTION

Accordingly, an object of the present invention is to provide a swing-type actuator free from the problem that a flash may be detached from a coil-arm molding structure, thereby capable of ensuring the high reliability of a magnetic recording apparatus.

Another object of the present invention is to provide a small and thin swing-type actuator which has a coil-arm molding structure having a drastically increased strength.

A further object of the present invention is to provide a small and thin swing-type actuator having excellent electric insulation between the lead wires and the movable coil.

The swing-type actuator according to the first embodiment of the present invention comprises:

(a) a housing comprising a pair of yokes and a permanent magnet attached to at least one of said yokes opposing each other for defining a magnetic gap therebetween;

(b) a swingable arm having one end to which a movable coil is fixed and the other end to which a function member is fixed, such that said movable coil is swingable in said magnetic gap;

(c) a hold member made of a thermoplastic resin, which encompasses a periphery of said movable coil and is integrally fixed to said arm; and (d) a resin coating layer formed on surfaces of said movable coil and said hold member.

The swing-type actuator according to the second embodiment of the present invention comprises:

(a) a housing comprising a pair of yokes and a permanent magnet attached to at least one of said yokes opposing each other for defining a magnetic gap therebetween;

(b) a swingable arm having one end to which a movable coil is fixed and the other end to which a function member is fixed, such that said movable coil is swingable in said magnetic gap;

(c) at least one platelike projection integrally projecting from said arm on the side of said movable coil; and (d) a hold member made of a thermoplastic resin and being molded such that it encompasses a periphery of said movable coil and said projection, thereby fixing said movable coil to said arm, said arm having flat surfaces in parallel with an axis of said arm on both sides in the vicinity of said hold member, and said hold member having a ledge on each side adjacent to said flat surfaces, which is perpendicular to said flat surfaces.

The swing-type actuator according to the third embodiment of the present invention comprises:

(a) a housing comprising a pair of yokes and a permanent magnet attached to at least one of said yokes opposing each other for defining a magnetic gap therebetween;

(b) a swingable arm having one end to which a movable coil is fixed and the other end to which a function member is fixed, such that said movable coil is swingable in said magnetic gap;

(c) at least one platelike projection integrally projecting from said swingable arm on the side of said movable coil;

(d) a hold member made of a thermoplastic resin and having substantially the same thickness as that of said movable coil, said hold member being molded such that it encompasses a periphery of said movable coil and said projection, thereby fixing said movable coil to said arm; and (e) a rib integrally formed on said hold member inside said movable coil.

The swing-type actuator according to the fourth embodiment of the present invention comprises:

(a) a housing comprising a pair of yokes and a permanent magnet attached to at least one of said yokes opposing each other for defining a magnetic gap therebetween;

(b) a swingable arm having one end to which a movable coil is fixed and the other end to which a function member is fixed, such that said movable coil is swingable in said magnetic gap;

(c) a hold member made of a thermoplastic resin, which encompasses a periphery of said movable coil and is integrally fixed to said arm; and (d) terminal pins disposed in said hold member outside a region defined by a pair of lines connecting a swing center of said movable coil and outer side peripheries of said movable coil, and outer periphery of said movable coil; and (e) a stopper member disposed in said hold member near a terminal pin closer to said movable coil, whereby a lead wire to be connected to the other terminal pin is prevented from flowing toward said terminal pin when produced by injection molding.

DETAILED DESCRIPTION OF THE PREFERRED EMBODIMENTS

The first embodiment of the present invention will be explained referring to FIGS. 1 and 2 in which the same reference numerals are assigned to the same parts as those in FIGS. 11 and 12.

An arm 5, which is produced from a thermoplastic resin (for instance, carbon fiber-reinforced thermoplastic resin (MK-2, manufactured by Sumitomo Bakelite Co., Ltd.)), has an aperture 8a in a center portion. A shaft (not shown) is rotatably fitted in the aperture 8a, so that the arm 5 is supported by a housing (not shown) for rotation about swing axis 8c. The arm 5 is also provided with an aperture 8b at one end for mounting a function member (not shown) such as a magnetic head to the arm 5. Terminals of the movable coil 6 are constituted by terminal pins 6a and lead wires 6b.

Incidentally, the movable coil 6 can be produced by winding a wire which has a self-melting coating around a core wire at a predetermined number of turns to form a multi-layer coil and then flowing current through this coil to generate heat for integrally fusing the wire.

A hold member 9, which is formed of a thermoplastic resin, encompasses the movable coil 6. The arm 5 and the movable coil 6 are integrally fixed by the hold member 9 preferably produced by injection molding. In the injection molding, the movable coil 6 having lead wires 6b to which terminal pins 6a are soldered is placed in a cavity of an injection mold, and a molten thermoplastic resin such as a carbon fiber-reinforced thermoplastic resin is injected into the cavity. After solidification, the resulting molding is taken out of the mold. By injection molding, the arm 5 and the movable coil 6 are integrally molded by means of the hold member 9.

The hold member 9 and the movable coil 6 of the actuator thus formed are then immersed in a resin solution such as an epoxy resin solution diluted 10 times by a solvent to form a resin coating layer 10 on the surfaces of the hold member 9 and the movable coil 6. The thickness of the resin coating layer 10 is preferably 10–100 μm.

By the formation of the resin coating layer, even if the hold member 9 has a flash, the flash would not be detached from the hold member 9.

When the swing-type actuator of the above structure is assembled into a magnetic disk apparatus, to conduct a continuous operation, there is no problem that a flash is detached from the resin molding and falls onto a magnetic medium, and the magnetic disk apparatus is operable without any trouble for a long period of time. In addition, the resonance point of the movable coil can be made higher.

In this embodiment, the resin coating layer may be formed of other resins than the epoxy resin.

EXAMPLE 1

Figure 1:
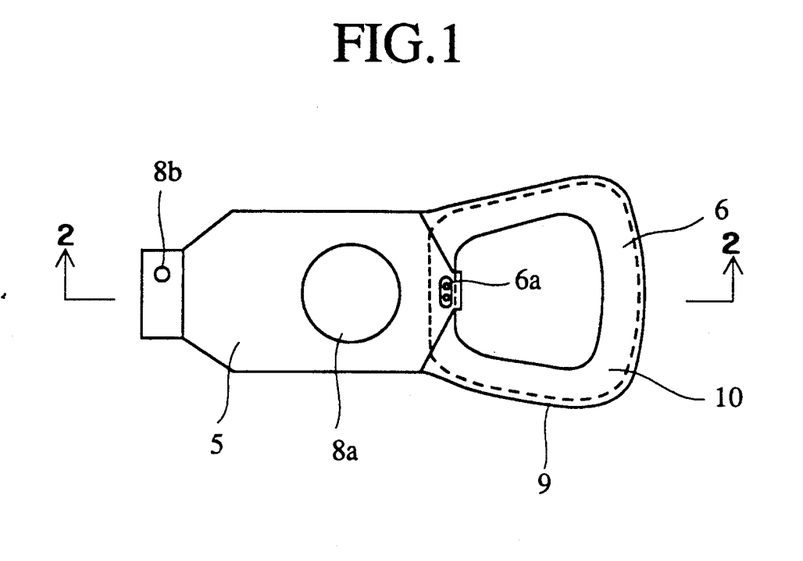
FIG. 1 is a plan view showing the swing-type actuator according to the first embodiment of the present invention.

In the swing-type actuator according to the first embodiment shown in FIG. 1, two movable coils (300 turns) were formed from a copper wire (diameter: 1 mm), and one was provided with an epoxy resin coating layer having a thickness of 50 μm, and the other was provided with no resin coating layer. Each movable coil to which an accelerator sensor was attached was placed on a vibrator to measure the sensitivity of the movable coil. The measurement was conducted at an input current of 0.2 A.

As a result, the movable coil 6 without the resin coating layer showed a drastically increased sensitivity when vibration frequency exceeded 3 kHz, and resonance took place at about 3.5 kHz. On the other hand, the movable coil 6 provided with the epoxy resin coating layer showed a constant sensitivity even when the vibration frequency exceeded 4 kHz, and the resonance frequency was near 4.1 kHz. Accordingly, it was confirmed that those having resin coating layers are extremely stable when they are used as high-speed actuators.

Figure 2:
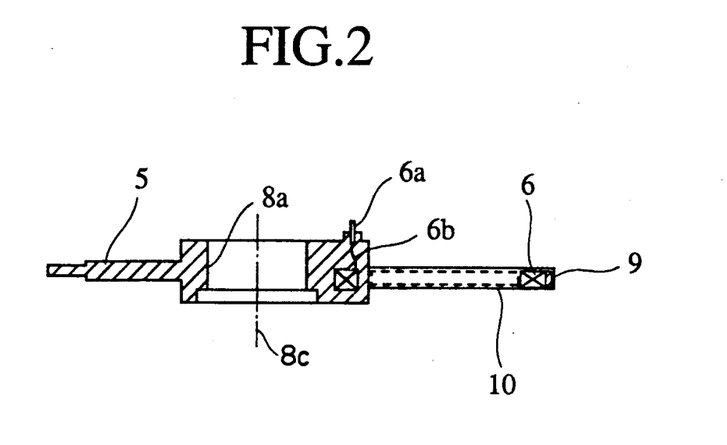
FIG. 2 is a cross-sectional view taken along the line A—A in FIG. 1.
Figure 3:
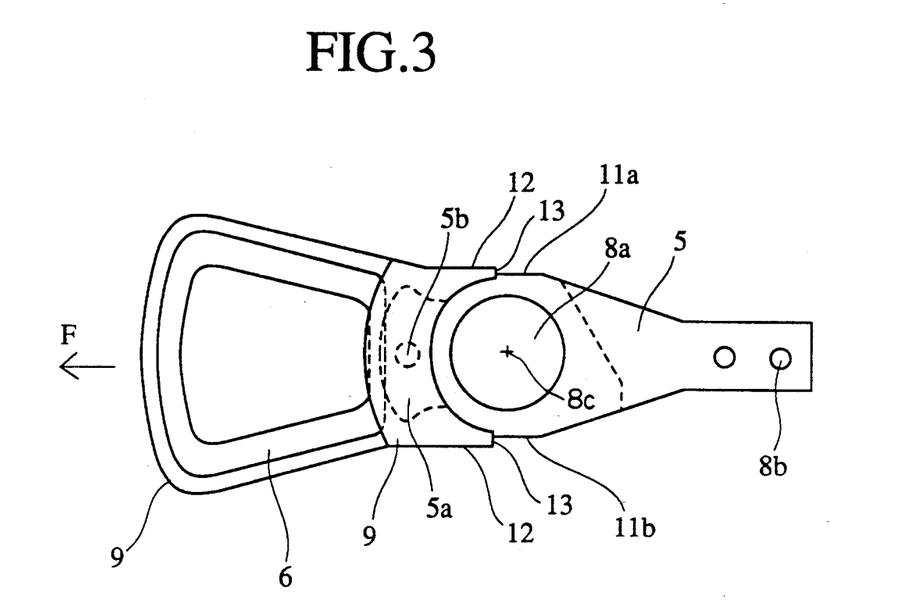
FIG. 3 is a plan view showing the swing-type actuator according to the second embodiment of the present invention.
Figure 4:
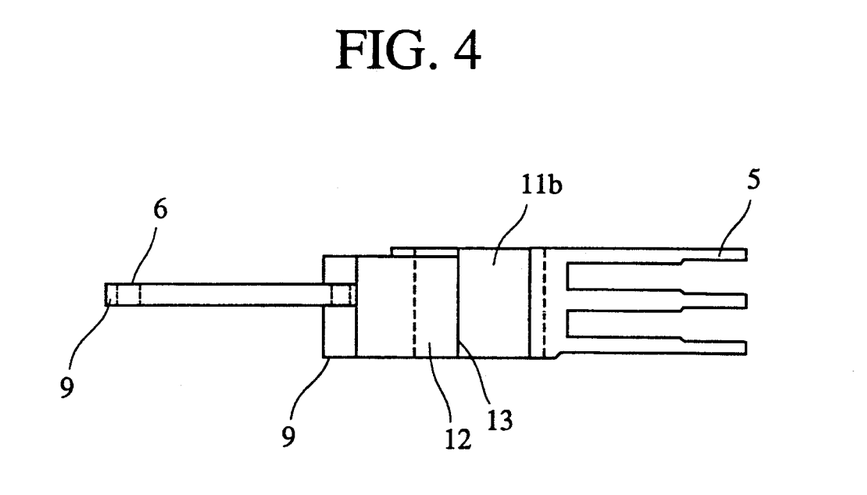
FIG. 4 is a side view of the swing-type actuator shown in FIG. 3.

FIGS. 3 and 4 show the second embodiment of the present invention, in which the same reference numerals are assigned to the same parts as those in FIGS. 1 and 2.

The arm 5 is integrally provided with a planar projection 5a on the side of the movable coil 6. The projection 5a has a through-hole 5b. In this embodiment, the projection 5a has a contour resembling a dovetail when viewed from above. Accordingly, this projection 5a is called "dovetail-shaped projection."

A hold member 9, which is formed of a thermoplastic resin, encompasses a periphery of the movable coil 6 and the dovetail-shaped projection 5a. Accordingly, the thermoplastic resin of the hold member 9 enters into the through-hole 5b of the dovetail-shaped projection 5a, so that the movable coil 6 and the dovetail-shaped projection 5a are strongly fixed by means of the hold member 9.

The arm 5 is also provided with flat surfaces 11a, 11b in parallel with swing axis 8c of aperture 8a in each side region adjacent to a hold member 9. The hold member 9 is provided with a ledge 12 on each side, which is adjacent to the arm 5. Each of the ledges 12 has a surface 13 in perpendicular to the flat surfaces 11a, 11b.

By the above structure, since a dimensional precision between the planes 11a and 11b of the arm 5 is greatly improved, a clearance between the arm 5 and a side surface of a cavity of the mold is drastically reduced when the arm 5 is placed in the cavity of the injection mold. As a result, an undesired flash is greatly prevented from forming on a periphery of the hold member 9. Also, even though a molten thermoplastic resin for the hold member 9 enters into the above gap, the thermoplastic resin would quickly be solidified, thereby preventing a harmful flash from growing. Accordingly, the size of the flash, if any, can be minimized. In addition, due to the ledges 12 each having a surface perpendicular to the flat surfaces 11a, 11b, parting faces of the injection mold halves (not shown) come into closer contact with each other, leading to the improvement of the dimensional precision of the coil-arm molding structure.

Also, the movable coil 6 is strongly supported by the hold member 9 in its periphery, and the dovetail-shaped projection 5a is embedded in the thermoplastic resin constituting the hold member 9. Also, since the thermoplastic resin enters into the through-hole 5b, the bonding strength of the arm 5 to the movable coil 6 is extremely high. That is, due to the dovetail-shaped projection 5a provided with the through-hole 5b, the resistance of the movable coil 6 from being detached from the arm 5 in the direction F is extremely high, and the bending strength of the arm is also improved.

EXAMPLE 2

In the swing-type actuator according to the second embodiment shown in FIGS. 3 and 4, resin molding was conducted under the following conditions:

Mold temperature $T_1$: 70°–100° C.
Molding pressure P: 400–700 kg/cm$^2$
Molding temperature $T_2$: 280°–360° C.

As a result, a coil-arm molding structure having a high resonance frequency (f) could be formed without suffering from a flash. It was confirmed that as the mold temperature $T_1$, the molding pressure P and the molding temperature $T_2$ increased (particularly when P and $T_2$ increased), the resonance frequency (f) increased. However, if $T_1$, P and $T_2$ were too high, a flash was likely to be formed. Accordingly, $T_1$, P and $T_2$ are desirably in the above ranges.

In this embodiment, since a clearance between the arm and the inner surface of the mold is extremely small, an undesired flash can be prevented. Accordingly, there is no need of removing the flash after the injection molding, and the reliability of the resin molded arm can be enhanced. Incidentally, a high precision of positioning the movable coil to the arm and the bonding strength of the movable coil to the arm are greatly improved.

Figure 5:
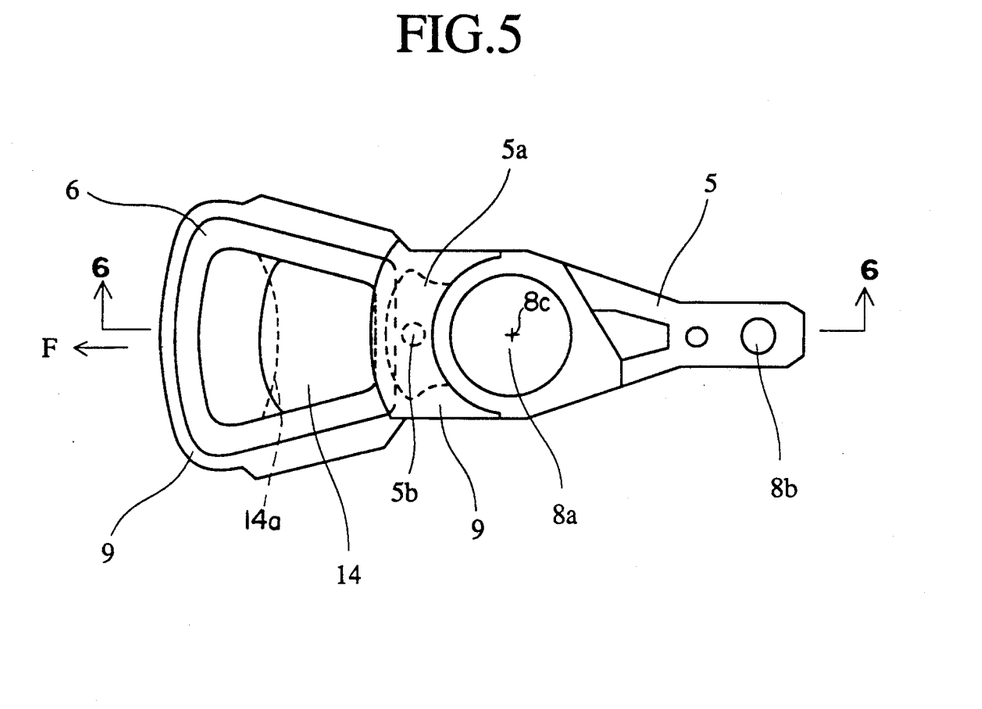
FIG. 5 is a plan view showing the swing-type actuator according to the third embodiment of the present invention.
Figure 6:
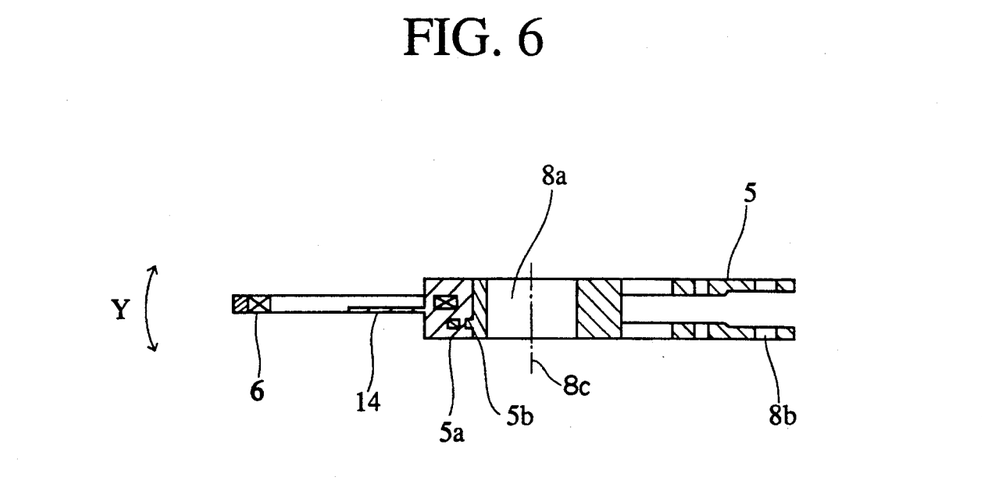
FIG. 6 is a cross-sectional view taken along the line B—B in FIG. 5.

FIGS. 5 and 6 show the third embodiment of the present invention, in which the same reference numerals are assigned to the same parts as those in FIGS. 1 and 2. An arm 5, which is produced from an aluminum alloy by a die casting method, has an aperture 8a in a center portion. A shaft (not shown) is rotatably fitted in the aperture 8a, so that the arm 5 is supported by a housing (not shown) for rotation about swing axis 8c. The arm 5 is also provided with an aperture 8b at one end for mounting a function member (not shown) such as a magnetic head to the arm 5.

14 denotes a rib integrally formed on the hold member 9 inside the movable coil 6. It is preferable that the rib 14 has a smaller thickness than that of the movable coil 6, and that the rib 14 is disposed at a position which permits the stopper (not shown) to be mounted in the hold member 9. The shape and size of the rib 14 are determined by considering the shape, size and weight of the arm 5. Accordingly, the rib 14 may have a shape and position as shown by the solid line in FIG. 5. Alternatively, the rib may have a shape and position as shown by dotted line in FIG. 5 and designated rib 14a.

The arm 5 and the hold member 9 are integrally formed preferably by injection molding. In the injection molding, the die-cast arm 5 and the movable coil 6 having lead wires to which terminal pins (not shown) are soldered are placed in a cavity of an injection mold, and a molten thermoplastic resin such as a glass fiber-reinforced polyphenylene sulfide resin is injected into the cavity. After solidification, the resulting molding is taken out of the mold. By injection molding, the arm 5 and the movable coil 6 are fixedly joined together.

By the above structure, the movable coil 6 is strongly supported by the hold member 9 in its periphery, and the dovetail-shaped projection 5a is embedded in the thermoplastic resin constituting the hold member 9. Also, since the thermoplastic resin enters into the through-hole 5b, the bonding strength of the arm 5 to the movable coil 6 is extremely high. That is, due to the dovetail-shaped projection 5a provided with the through-hole 5b, the resistance of the movable coil 6 from being detached from the arm 5 in the direction F is extremely high, and the bending strength of the arm in the direction "Y" is also improved.

Also, due to the rib 14 integrally mounted to the hold member 9 inside the movable coil 6, good balance is achieved between portions of the arm 5 on both sides of the aperture 8a, leading to a reduced rotational torque. As a result, the rotation of the arm 5 becomes smooth. Incidentally, since the movable coil 6 is held by the rib 14 from between opposing portions of the inner periphery in the swing direction, the movable coil 6 is further reinforced.

In this embodiment, even in the case of a thin movable coil, a good balance can be kept between the movable coil and the arm, thereby ensuring the smooth rotation of the arm.

Figure 7:
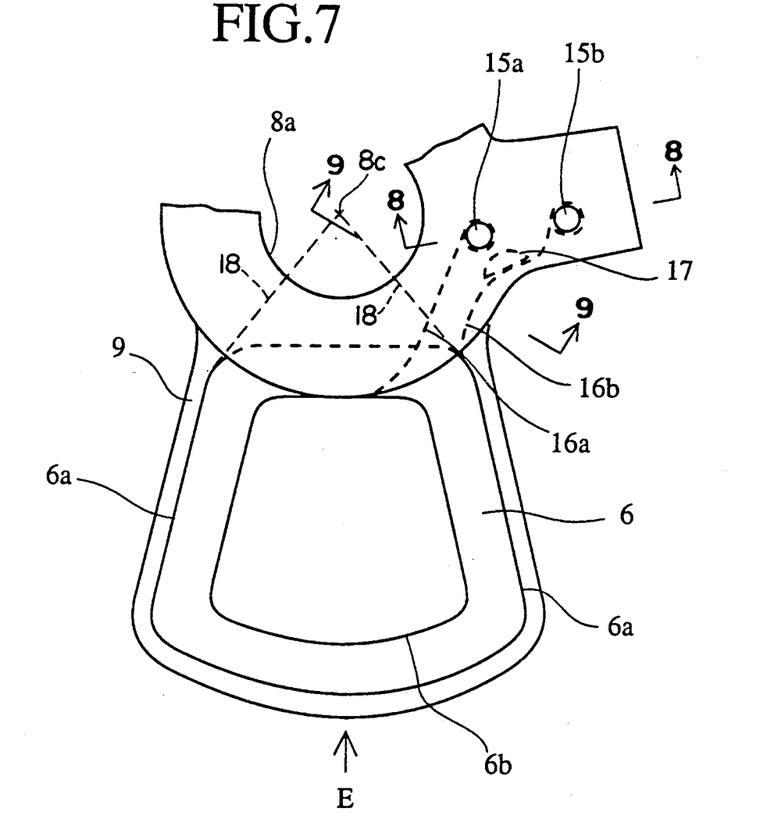
FIG. 7 is a plan view showing the swing-type actuator according to the fourth embodiment of the present invention.
Figure 8:
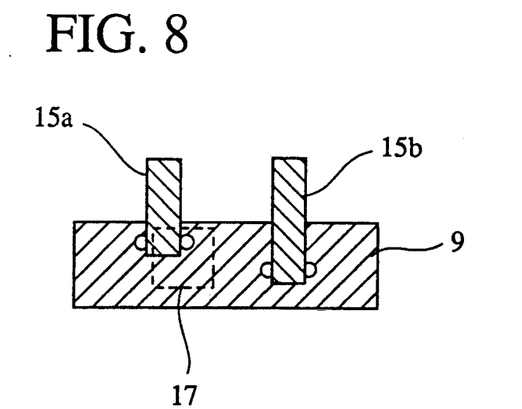
FIG. 8 is a cross-sectional view taken along the line C—C in FIG. 7.
Figure 9:
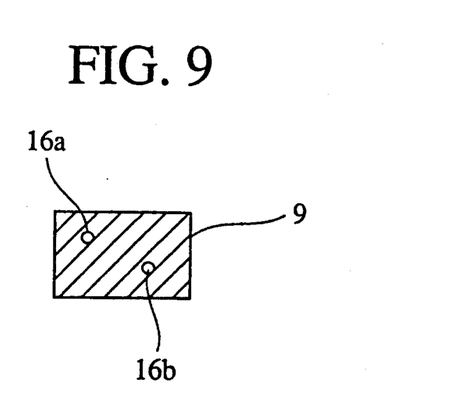
FIG. 9 is a cross-sectional view taken along the line D—D in FIG. 7.

FIGS. 7-9 shows the fourth embodiment of the present invention, in which the same reference numerals are assigned to the same parts as those in FIGS. 1 and 2.

9 denotes a hold member made of a thermoplastic resin having an electric insulation and encompassing a movable coil 6, and the hold member 9 is provided with an aperture 8a for a shaft on which the arm (both not shown) rotates about swing axis 8c. Each of terminal pins 15a, 15b is disposed in the hold member 9 outside a region defined by two lines 18 connecting a center of the aperture 8a and outer side periphery of the movable coil 6, and an outer periphery 6b of the movable coil 6, and soldered to lead wires 16a, 16b of the movable coil 6. Incidentally, since the lead wires 16a, 16b are arranged close to each other within the hold member 9, it is preferably that the lead wires 16a, 16b are arranged vertically separate from each other as shown in FIG. 9.

A stopper member 17 is disposed within the hold member 9 near the terminal pin that is closer to the movable coil 6 namely pin 15a in the FIG. 7 embodiment. The stopper member 17 has a half moon-shaped cross section and is arranged such that a flat surface of the stopper member 17 faces the lead wire 16b as shown in FIG. 7.

In the above structure, the movable coil 6, the terminal pins 15a and 15b are integrally fixed within the hold member 9 by injection molding. In the injection molding, the movable coil 6, the terminal pins 15a, 15b to which lead wires 16a, 16b are connected, and the stopper member 17 are placed in a cavity of the injection mold having a contour corresponding to the outer shape of the hold member 9. In this case, when a molten thermoplastic resin is injected into the cavity in the direction shown by "E" in FIG. 9, the resin flow in the cavity exerts a force on lead wire 16b toward the terminal pin. However, since there is the stopper member 17 near the terminal pin 15a, the movement of the lead wire 16b is prevented. Accordingly, contact between the lead wires 16a and 16b or between the lead wire 16b and the terminal pin 15a can be prevented. Thus, the actuator of this embodiment is provided with extremely improved electric insulation.

In this embodiment, the stopper member 17 is depicted as having a semi-circular cross section, but it should be noted that other geometric shapes may be used to achieve the same effect. Incidentally, it is preferable that the surface of the stopper member 17 facing the lead wire 16b is in a flat plane or a curved plane having a large radius of curvature.

Figure 10:
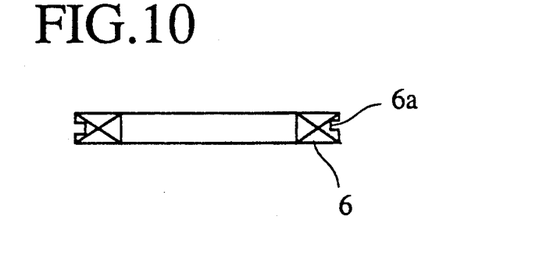
FIG. 10 is a cross-sectional view showing another example of a movable coil according to the present invention.

FIG. 10 shows another example of a movable coil 6 according to the present invention. In FIG. 10, 6a represents a circumferential groove of the movable coil 6 for preventing the movable coil 6 from being detached from the hold member 9. The groove 6a functions to increase the fixing strength of the movable coil 6 to the hold member 9.

In any embodiments shown above, it is preferable that the hold member 9 encompassing the movable coil 6 has substantially the same thickness as that of the movable coil 6. By this structure, the magnetic gap can be reduced, leading to increased driving force and response speed.

The thermoplastic resins for constituting the hold member 9 may be selected depending upon rigidity and heat resistance required for it. Examples of such thermoplastic resins include polyarylene sulfides such as polyphenylene sulfide, polyamide resins, polyimide resins, polyamideimide resins, polyester resins such as polybutylene terephthalate, polybutylene naphthalate, etc. These thermoplastic resins are preferably heatresistant resins.

The thermoplastic resins have a longitudinal modulus of $10 \times 10^4$ kg/cm$^2$ or more (measured according to ASTM D-638), and the longitudinal modulus is preferably $13 \times 10^4$ kg/cm$^2$ or more. Particularly, it is preferable to use liquid crystal polymers (showing a liquid crystallinity in a molten state) such as liquid crystal polyesters (having rigid skeletons).

In order to improve the mechanical strength of the arm-coil structure without accompanying the increase of weight, fillers such as carbon fibers having small specific gravities may be added to the thermoplastic resin. The amount of the fillers which may be added is preferably 10–50% by weight, and more preferably 20–40% by weight.

In the above embodiments, the actuators for magnetic heads are described, but it should be noted that the swing-type actuator of the present invention can be applicable not only to magnetic heads but also to optical heads, etc. Also, a magnetic circuit may be constituted by one or more permanent magnets attached to one of the two yokes.

What is claimed is:

1. A swing-type actuator comprising:
   (a) a housing comprising a pair of yokes opposing each other and a permanent magnet attached to at least one of said yokes for defining a magnetic gap therebetween;
   (b) a coil having an outer periphery and having a part with a thickness for being movable through said magnetic gap;
   (c) a swingable arm having one end adapted to receive said movable coil and another end to which a function member is fixable, such that said part of said movable coil is swingable in said magnetic gap;
   (d) a hold member made of a thermoplastic resin, which hold member is formed by molding to encompass said outer periphery of said movable coil and said one end of said arm whereby said coil is fixed to said arm; and
   (e) means for preventing during operation of said actuator, detachment of any particles of flash formed during the molding of said hold member, said detachment preventing means including a resin coating layer formed on surfaces of said movable coil and said hold member, said resin coating layer having a thickness which is thin relative to the thickness of said coil part.

2. The swing-type actuator as in claim 1 wherein the thickness of said resin coating layer ranges from 10 μm–100 μm.

3. A swing-type actuator comprising:
   (a) a housing comprising a pair of yokes opposing each other and a permanent magnet attached to at least one of said yokes for defining a magnetic gap therebetween;
   (b) a coil having an outer periphery and having a part with a thickness for being movable through said magnetic gap;
   (c) a swingable arm having a swing axis and also having one end adapted to receive said movable coil and another end to which a function member is fixable, such that said part of said movable coil is swingable in said magnetic gap;
   (d) a hold member made of a thermoplastic resin and being formed by molding such that it encompasses said outer periphery of said movable coil and said one end of said arm, thereby fixing said movable coil to said arm; and
   means for aligning said arm and said hold member for minimizing flash formation, said aligning means including said arm having flat surfaces in parallel with said moving axis of said arm on both sides adjacent said hold member, and said hold member having a ledge on each side adjacent to said flat surfaces, each ledge having a surface perpendicular to a respective one of said flat surfaces.

4. A swing-type actuator comprising:
   (a) a housing comprising a pair of yokes opposing each other and a permanent magnet attached to at least one of said yokes for defining a magnetic gap therebetween;
   (b) a coil having an outer periphery and an inner periphery, said coil also having a part with a thickness for being movable through said magnetic gap;
   (c) a swingable arm having one end adapted to receive said movable coil and the other end to which a function member is fixable, such that said part of said movable coil is swingable in a direction through said magnetic gap;
   (d) a hold member made of a thermoplastic resin, said hold member being formed by molding such that it encompasses said outer periphery of said movable coil and said one end of said arm, thereby fixing said movable coil to said arm; and
   (e) said hold member including a rib integrally formed inside said movable coil and extending between opposed portions of said coil inner periphery along said swinging direction, said rib having a thickness less than the thickness of said coil part.

5. A swing-type actuator comprising:
   (a) a housing comprising a pair of yokes opposing each other and a permanent magnet attached to at least one of said yokes for defining a magnetic gap therebetween;
   (b) a swingable arm having a swing axis and also having one end adapted to receive said movable coil and another end to which a function member is fixable, such that said part of said movable coil is swingable in said magnetic gap;
   (c) a hold member made of a thermoplastic resin and being formed by molding for encompassing said outer periphery of said movable coil and said one end of said arm, whereby said coil is fixed to said arm;
   (d) terminal pins disposed in said hold member outside a region defined by a pair of radially directed lines connecting said swing axis and outer side peripheries of said movable coil, and outer periphery of said movable coil;
   (e) lead wires electrically interconnecting said terminal pins and said coil and disposed in said hold member, one of said lead wires being connected to one of said terminal pins and also extending closely adjacent another of said terminal pins; and
   (f) insulating means including a stopper member disposed in said hold member between said one lead wire and said another terminal pin, whereby said one lead wire is prevented from contacting said another terminal pin when said hold member is formed by molding.

6. The swing-type actuator as in claim 5 wherein said insulating means includes said lead wires being spaced from one another along a direction parallel to the swing axis.

7. The swing-type actuator as in claim 5, wherein said stopper member includes a generally planer surface facing said one lead wire.

* * * * *